(12) United States Patent
Pagana-Lausch (10) Patent No.: US 8,721,338 B2
(45) Date of Patent: May 13, 2014

(54) METHOD AND DEVICE TO TEACH HAIR COLORING (76) Inventor: Annabel Pagana-Lausch, Bloomingdale, NJ (US)

(*) Notice: Subject to any disclaimer, the term of this patent is extended or adjusted under 35 U.S.C. 154(b) by 30 days.

(21) Appl. No.: 13/450,449

(22) Filed: Apr. 18, 2012

(65) Prior Publication Data

US 2013/0280688 A1    Oct. 24, 2013

(51) Int. Cl.
*G09B 19/10* (2006.01)
(52) U.S. Cl.
USPC .................................................. 434/94
(58) Field of Classification Search
USPC ............. 434/81, 82, 94, 96, 98, 99, 100, 104; 446/296, 372, 394
See application file for complete search history.

(56) References Cited

U.S. PATENT DOCUMENTS

| | | | |
|---|---|---|---|
| 3,458,943 A | 8/1969 | Trowbridge | |
| 3,736,064 A | 5/1973 | Kent | |
| 4,403,962 A | 9/1983 | La Vista | |
| 4,434,467 A | 2/1984 | Scott | |
| D276,661 S * | 12/1984 | Cafazzo | D28/20 |
| 4,553,328 A * | 11/1985 | Buscher | 33/32.7 |
| 4,561,850 A * | 12/1985 | Fabbri et al. | 434/98 |
| 4,669,985 A * | 6/1987 | Hvalsbraten | 434/94 |
| 4,761,137 A * | 8/1988 | Taylor et al. | 434/99 |
| 4,810,196 A * | 3/1989 | Walker | 434/94 |
| 5,010,914 A * | 4/1991 | Merges | 132/54 |
| 5,316,481 A | 5/1994 | Louise et al. | |
| 5,779,479 A | 7/1998 | Hawiuk | |
| 5,819,960 A | 10/1998 | Bonazza | |
| 6,067,504 A | 5/2000 | MacFarlane et al. | |
| 6,719,565 B1 | 4/2004 | Saita et al. | |
| 6,918,767 B2 * | 7/2005 | Ploix | 434/94 |
| 6,955,261 B2 * | 10/2005 | Ploix et al. | 206/388 |
| 6,994,552 B2 * | 2/2006 | Hirata et al. | 434/94 |
| 7,164,347 B2 * | 1/2007 | Nita | 340/326 |
| 7,523,018 B2 | 4/2009 | Grossinger et al. | |
| 7,758,347 B2 | 7/2010 | Sasaki | |
| 7,877,294 B2 | 1/2011 | Inzinna, Jr. | |
| 8,262,392 B2 * | 9/2012 | Kubo | 434/94 |
| 2002/0042958 A1 | 4/2002 | Orr et al. | |
| 2003/0081332 A1 | 5/2003 | Sakai | |
| 2004/0163188 A1 | 8/2004 | Firkins | |
| 2004/0239689 A1 | 12/2004 | Fertig | |
| 2005/0165705 A1 | 7/2005 | Lauper | |
| 2005/0264794 A1 | 12/2005 | Inzinna, Jr. | |
| 2007/0033140 A1 | 2/2007 | Slattery et al. | |
| 2007/0222547 A1 | 9/2007 | Stahle et al. | |
| 2010/0088036 A1 | 4/2010 | Goddard-Clark | |

OTHER PUBLICATIONS www.clairolpro.com/hair-color-techniques/basic/color-theory, 2010.

(Continued)

*Primary Examiner* — Kurt Fernstrom
(74) *Attorney, Agent, or Firm* — The McHattie Law Firm (57) ABSTRACT

The present invention relates to a method and device to teach hair coloring. In particular, the present invention provides a three dimensional mannequin head with hair dyed to correspond to a traditional two-dimensional color wheel, i.e., in the configuration of a three-dimensional color wheel that is used to teach others, such as, for example, hairdressers, beauticians, or any person who may have occasion to color hair, how to select the appropriate dye colors to achieve a desired hair color. The present invention also provides teaching methods utilizing the three dimensional mannequin head.

9 Claims, 4 Drawing Sheets
(4 of 4 Drawing Sheet(s) Filed in Color)

(56) References Cited

OTHER PUBLICATIONS http://harcrazy.info/hair-science/colour-theory-for-hair-dyeing, Mar. 2005.
www.hairdressingworld.com/hairdressersforum/hairdressing-article, Jul. 2007.
www.ecocolors.net; publication downloaded Jan. 27, 2012.
www.worldwidelearn.com/cosmetology/permanent-cosmetics/color; publication downloaded Jan. 27, 2012.

\* cited by examiner

METHOD AND DEVICE TO TEACH HAIR COLORING

FIELD OF THE INVENTION

The present invention relates to a method and device to teach hair coloring. In particular, the present invention provides a three dimensional mannequin head with hair dyed to correspond to a traditional two-dimensional color wheel, i.e., in the configuration of a three-dimensional color wheel that is used to teach others, such as, for example, hairdressers, beauticians, or any person who may have occasion to color hair, how to select the appropriate dye colors to achieve a desired hair color. The present invention also provides teaching methods utilizing the three dimensional mannequin head.

BACKGROUND

Hair coloring is the practice of changing, restoring and/or maintaining the color of hair. Common reasons for hair coloring include, for example, to cover gray hair, to change to a color regarded as more fashionable or desirable, and to restore the original hair color after hairdressing processes, sun bleaching, or other processes have discolored it.

One of the major problems in the hair color art is teaching someone how to determine exactly the proper coloring agent(s) to use in order to achieve a person's desired hair color. Hair coloring choices are often made based on relatively vague indications of the color to be expected as a result of the use of a single coloring agent on an individual person's hair. However, coloring hair is not akin to painting a wall, i.e., if you want a brown wall, you choose brown paint to cover over the prior color. In order to color hair to yield a natural looking result, the starting color of the hair must be taken into consideration. For example, if a desired end result is red tones, merely adding red colorants will not produce the desired end goal. In hair coloring, the tones blend. If the starting color contained yellow tones, the end result in that case would be orange in nature because red added to yellow produces orange. Unless the yellow was first counteracted, red alone would produce undesirable results. Thus, the person coloring the hair must fully understand color theory and starting points to achieve a consistent desired end result. While a number of tools exist that can guide a person in making the appropriate coloring agent(s) selection, they are frequently difficult to use, or require expensive instrumentation to use, such that many hairdressers, beauticians, any person who may have occasion to color hair, salons or cosmetology schools cannot understand or afford. The existing tools may also achieve only approximate results, which frustrate the consumer. Furthermore, the methods by which hair coloring techniques are taught are frequently over complicated, focusing on the specific chemistry of a given manufacturer's coloring agents, rather than the underlying color theory, which can be universally applied.

For example, U.S. Pat. No. 7,877,294B2 discloses a computer implemented method and system for determining the formula or formulas of hair coloring agents to be used in the process of coloring hair, including the steps of receiving input on the current color, state, and desired color of the hair, and using a database of hair coloring formulas to determine the coloring agents to be used, quantities of such coloring agents, application time of such coloring agents, and refreshing options that can be applied to the hair to treat and correct faded hair ends. The computer in some embodiments is portable, and includes a processor, an electronic storage means in which the hair color formula database is stored, and software that defines the process by which the correct hair color formula is determined. The computer software determines the best formula and process steps to be taken to achieve the desired hair color.

In another example, U.S. Pat. No. 7,758,347B2 discloses a hair color simulation system for simulating a dyed hair color that results from dyeing hair with a mixture of two hair color preparations [that] includes a base screen with a first through fifth layers and an intermediate layer. The first through fifth layers and the intermediate layer are superimposed over one another so as to display a simulated hair color that is produced when the first hair line, the second hair line, the colors of the two hair color preparations and the original hair color are displayed on the layers with respective transparencies and superimposed over each other. The RGB values of the superimposed colors produced by the two hair color preparations and the original hair color are stored in data storage sections. Input sections receive choices of the two hair color preparations and a mixing ratio for the simulation.

In another example, U.S. Pat. No. 7,523,018B2 discloses a system for determining hair color treatment, including a processor. The processor is configured for: receiving as input an initial spectrum of a sample of hair, the initial spectrum having a wavelength range; calculating a new spectrum of the hair due to a hypothetical hair color treatment as a direct function of the initial spectrum; and outputting data to a device, the data being based upon the step of calculating. The system also includes a spectrum analyzer configured for producing the initial spectrum and a display device configured for displaying a color and hair color treatment instructions based on the data. An alternate embodiment of the invention includes a color mixing device configured for dispensing a hair color treatment based on the data.

In another example, U.S. Pat. No. 6,719,565B1 discloses a simulated image in which a subject's hair is changed to a desired color, and to accurately suggest the hair dye needed to dye the subject's hair from its existing color to the desired color. To achieve this object, the hair color advice system according to the present invention includes (i) an image memory into which image data regarding the subject is input and stored, (ii) a processor that finds the hair area in the input image of the subject and builds a simulated image in which the color of the hair area is changed to any color, and (iii) a monitor 4 on which the input image of the subject and/or the simulated image are displayed.

In another example, U.S. Pat. No. 6,067,504A discloses [m]ethods and apparatus for determining accurate hair color classifications and appropriate coloring agents to bring about a selected change of color include a table of hair color classifications, a color measuring instrument to arrive at Hunter L, a and b values for use in identifying a particular classification from the table and a database that identifies appropriate coloring agents based on a selection of coloring actions from a menu and the classifications of hair color.

In another example, U.S. Pat. No. 5,819,960A discloses a hair coloring easel used by a hair stylist includes multiple hair coloring solution compartments and multiple foil holding compartments formed in a tray. The tray is coupled to a cart. The hair coloring solution compartments each hold a tint bowl for storing a hair coloring solution. The foil holding compartments each hold a foil material. The hair coloring solution and foil holding compartments are correlated as pairs according to their relative position and a reference indicia such as color.

In another example, U.S. Pat. No. 5,779,479 discloses a method and apparatus for illustrating and teaching hair coloring techniques.

In another example, U.S. Pat. No. 5,316,481A discloses a system for displaying and selecting, a process for selecting, and a device for selecting hair dye shades, which allow the consumer to make a knowledgeable and informed hair dye selection. A horizontal or vertical axis along which hair dyes are arranged by similar colors and shades; another axis, perpendicular to the first axis, along which hair dyes are arranged by the length of duration of effect; a hair dye shade selector comprising color samples that each represent the hair color that will result when hair of a particular color is treated with a particular hair dye are included; on-shelf consumer education and instruction materials regarding hair dye; display system indicators; and packaging indicators.

In another example, U.S. Pat. No. 4,810,196 discloses a mannequin for use as a tool in demonstrating a variety of hair styling techniques such as hair cutting, permanent waving, blending, texturizing and the like includes a simulated human head having a skull, scalp, and human hair attached to the scalp. The hair is of a length and thickness approximating that of an individual of a prescribed sex, size, and type. In a preferred embodiment as used for demonstrating hair cutting techniques, a plurality of variously colored line diagrams are applied to the hair to defined a plurality of cutting lines to be followed to accomplish a plurality of prescribed hair styles.

In another example, U.S. Pat. No. 4,434,467A discloses a device for determining the hair coloring products to be used to change the user's present hair color to a new hair color. The device includes a keyboard for entering a designation which identifies the user's present hair color and the desired hair color. The user also enters data to identify the particular line of hair coloring products which the user desires to use. The device then responds to such data by displaying the designations of hair coloring products of the chosen line which will change the user's present hair color to the new hair color.

In another example, U.S. Pat. No. 4,403,962 discloses a mannequin head form having human or artificial hair in which the hair bearing surfaces are marked to permit demonstration of hairdressing techniques by an instructor and to guide a student in learning and practicing such techniques. Respective ones of a group of head forms may have markings and indicia to show: areas for blocking for permanent waving; shapes and locations of curls; direction of finger and tool placement for waving and the like; directions for partitioning the hair for cutting, parting, bleaching, and coloring; and other general or specialized instructional markings. The markings and indicia are visible to the user as the hair is manipulated.

In another example, U.S. Pat. No. 3,736,064A discloses [a] method . . . in . . . hair tinting and bleaching, whereby [a] cosmetologist may determine exactly the shade level of a patron's hair for tinting or bleaching purposes. In addition, [the cosmetologist] can determine exactly the number of shade lifts the hair has undergone during a tinting operation, or the number of stages of bleach the hair has undergone during a bleaching operation. A simple, hand-held instrument is provided which measures the shade level of the patron's hair directly and instantaneously, and which enables the cosmetologist initially to determine the level of color tint to use, and then to determine exactly whether or not the hair has been lifted the desired number of shades. To assist in carrying out the method of the invention, the color tints themselves should be [labeled] to designate their respective shade levels.

In another example, U.S. Pat. No. 3,458,943 discloses a model head . . . encompassed with Velcro nylon loop binder material over the area normally covered by hair.

In another example, U.S. Patent Application 20100088036A1 discloses a method for hair coloring and selecting a hair colorant formulation based on hair type that minimizes variations in resultant hair color among different users having different hair types.

In another example, U.S. Patent Application 20070222547A1 discloses [m]ethods . . . for simulating custom hair color results, for selecting a resulting custom hair color from among possible custom hair color results, and for formulating custom hair coloring compositions which impart to hair such custom hair color results.

In another example, U.S. Patent Application 20070033140A1 discloses a system for facilitating selection of a hair dye product may include a front cover defining a plurality of windows and a plurality of representations of hair dye products associated with the plurality of windows. The system may further include at least one element including a plurality of representations of dyed hair colors. The front cover and the at least one element may be configured such that at least some of the representations of dyed hair colors may be viewed through at least some of the windows of the front cover, so that at least some of the representations of hair dye products may be associated with at least some corresponding representations of dyed hair colors.

In another example, U.S. Patent Application 20050264794A1 discloses a computer implemented method and system for determining the formula or formulas of hair coloring agents to be used in the process of coloring hair, including the steps of receiving input on the current color, state, and desired color of the hair, and using a database of hair coloring formulas to determine the coloring agents to be used, quantities of such coloring agents, application time of such coloring agents, and refreshing options that can be applied to the hair to treat and correct faded hair ends. The computer in some embodiments is portable, and includes a processor, an electronic storage means in which the hair color formula database is stored, and software that defines the process by which the correct hair color formula is determined. The computer software determines the best formula and process steps to be taken to achieve the desired hair color.

In another example, U.S. Patent Application 20050165705A1 discloses graphical interfaces [that] are provided to a customer enabling her to identify her existing hair color and to select a desired change to that hair color, based upon which there is produced hair dyes and/or intensive toners in which the intermediates (developer and coupler) and the direct dyes are dissolved in liquid or creamy carrier masses that are mixed together by a computer-controlled device based on recipes stored in a computer. Using packaged dyes and chemicals, there is formulated, mixed, packaged and dispensed to the customer a custom hair colorant.

In another example, U.S. Patent Application 20040239689A1 a method for a hair color consultation or a hair color simulation, wherein the patron's desired hair color is displayed on a screen.

In another example, U.S. Patent Application 20040163188A1 discloses a system and method for formulation of a personalized permanent hair color product.

In another example, U.S. Patent Application US20030081332A1 discloses a mirror for checking dyed hair color has a mirror and a colored filter formed on part or the whole of the surface of the mirror. The colored filter is formed such that the color of the reflected image of hair from the colored filter is the same as the dyed hair color for when the hair has been dyed with a particular hair dye. By using this mirror for checking dyed hair color, it is possible to easily predict hair color after dyeing for any given initial hair color, thus making it possible to easily select a hair dye for obtaining a desired dyed hair color.

In another example, U.S. Patent Application 20020042958A1 discloses a system and method of on-site formulation of a personalized permanent hair color product. The system and method are used to produce on-site at the salon, a permanent hair color tailored to the color and the ratio of unpigmented hair to pigmented hair of each individual. The key to choosing the correct color for an individual is by predetermining the amount of un-pigmented to pigmented hair and selecting from a stock palette of formulas divided into two or more and preferably three series of tones varying in depth and tone depending on the ratio of un-pigmented to pigmented hair.

In another example, the article located at www.ecocolors-.net states "most hair colors are defined by the lift/deposit ratio. This is commonly known as the level system. Level One means black and Level Ten means the absence of all pigments as the lightest blonde. Gray hair is also the absence of Melanin. There could be as much as two levels of color difference between two different manufacturer's hair colors of the same color. We suggest the only way to know these colors is to experiment on swatches. The next time you give someone a big haircut, save some hair and use it to learn what EcoColors Haircolor can do."

In another example, the article located at www.clairolpro-.com/hair-color-techniques/basic/color-theory, entitled "Color Theory from the Clairol Professional Hair Color Experts" discloses a formula by which hair color results can be "summed up".

In another example, the article located at www.worldwidelearn.com/cosmetology/permanent-cosmetics/color, entitled "Color Wheel" states "comprehending color theory is vital for successful permanent cosmetic technicians."

In another example, the article located at http://haircrazy-.info/hair-science/colour-theory-for-hair-dyeing, entitled "Colour Theory for Hair Dyeing" states "the colours of the spectrum can be displayed in a wheel showing how one colour blends into another. You can use this to determine how a hair colour will look with another as well as how to fix unwanted hair colours and how to perfect toning hair."

In another example, the article located at www.hairdressingworld.com/hairdressersforum/hairdressing-article, entitled "The Basic Theory of Hair Coloring" states "All artificial colours are based on one, or more, of the three primary colours: red, blue and yellow. These form the basis of the colour circle. The other colours on the circle are produced when the primary colours are mixed together. Examples: yellow+blue=green, blue+red=purple, etc. Opposite colours on the circle neutralize each other, e.g. blue neutralizes orange and green neutralizes red. A blue-based shade should not be applied to hair with yellow tones as it could result in a greenish cast. This is because green is positioned between blue and yellow on the colour circle. The same happens if a red shade is applied to hair with yellow tones. Result? An orange cast."

There exists a need for teaching methods and related devices to simply and effectively teach hairdressers, beauticians, or any person who may have occasion to color hair how to appropriately select coloring agents for a person's desired hair color without the need for expensive complicated assistive devices.

The present invention solves these problems by providing an inexpensive teaching device, consisting of a mannequin head that enables both basic and advanced concepts of color theory to be taught in a context familiar to hairdressers, beauticians, or any person who may have occasion to color hair, such that hairdressers, beauticians, or any person who may have occasion to color hair may appropriately select the necessary combination of coloring agents to achieve the desired hair color of a person based upon their starting color.

SUMMARY

In one embodiment, the present invention provides a mannequin head with hair dyed to correspond to a traditional two-dimensional color wheel, i.e., in the configuration of a three-dimensional color wheel that is used to teach others how to select the appropriate dye colors to achieve a desired hair color.

In one embodiment, the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, the hair is dyed the color of the underlying pigment of the color level the segment corresponds to.

In one embodiment, the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, the hair is dyed the color of the color level the segment corresponds to.

In one embodiment, the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, in a first area, the hair is dyed the color of the underlying pigment of the color level the segment corresponds to, and in a second area adjacent to first area, the hair is dyed the color of the color level the segment corresponds to.

In one embodiment the mannequin head of the present invention has the hair attached. In an alternate embodiment, a wig is utilized to provide the various embodiments as described herein of the three-dimensional color wheel of the present invention, and the wig is placed onto a mannequin head that lacks hair, or, alternatively, onto a mannequin head that has hair simply covering the existing hair. In one embodiment, the hair of the wig is dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, the hair of the wig is dyed the color of the underlying pigment of the color level the segment corresponds to. In an alternate embodiment, the hair of the wig is dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, the hair of the wig is dyed the color of the color level the segment corresponds to. In an alternate embodiment, the hair of the wig dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, in a first area, the hair of the wig is dyed the color of the underlying pigment of the color level the segment corresponds to, and in a second area adjacent to first area, the hair of the wig is dyed the color of the color level the segment corresponds to.

In one embodiment, the present invention provides a method to teach hair coloring utilizing the mannequin head of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form part of the specification, illustrate various embodiments of the present invention and, together with the description, further serve to explain the principles of the invention and to enable a person of ordinary skill in the art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 2 shows one embodiment of the mannequin head of the present invention, wherein the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, the hair is dyed the color of the underlying pigment of the color level the segment corresponds to.

FIG. 3 shows an alternate embodiment of the mannequin head of the present invention, wherein the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, the hair is dyed the color of the underlying pigment of the color level the segment corresponds to.

FIG. 4 shows an alternate embodiment of the mannequin head of the present invention, wherein, the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, in a first area, the hair is dyed the color of the underlying pigment of the color level the segment corresponds to, and in a second area adjacent to first area, the hair is dyed the color of the color level the segment corresponds to.

DETAILED DESCRIPTION

For clarity of disclosure, and not by way of limitation, the detailed description of the invention is divided into the following subsections that describe or illustrate certain features, embodiments or applications of the present invention.

Definitions

"coloring agent" or "hair dye" as used herein refers to a chemical solution containing a chromaphore that is capable of imparting a particular color to hair.

"cosmetologist" as used herein refers to a person who gives or advises on beauty treatments to the skin and hair of a person, for example, but not limited to, or a hairdresser, beautician, or anyone who has occasion to color hair.

Color Theory

Hair color is a result of the reflection of light off of the colored pigments in the hair shaft. A shade of color is made up of different combinations of reflections off the pigments, and results in hair color appearing different under different lighting conditions. Color levels are the degrees of lightness or darkness of a color seen by the eye. Hair color is assigned a level number from 1 to 10, with 10 being the lightest and 1 being black. Black reflects very little light and the lightest shades of blonde reflect the greatest amount of light.

All natural hair colors have an underlying pigment of red, yellow and orange. Cosmetologists are required to be familiar with the underlying pigments of each hair level in order to achieve a natural looking end result, or to correct inappropriately dyed hair (dyed hair with brassiness, or yellow tones, for example). Cosmetologists are also required to be familiar with the correct color that is required to neutralize or enhance the underlying pigments in the hair, in order to achieve the desired hair color.

| Color level | Color | Underlying Pigment |
| --- | --- | --- |
| 1 | Black | Blue |
| 2 | Very Dark Brown | Blue/Violet |
| 3 | Dark Brown | Violet |
| 4 | Brown | Red/Violet |
| 5 | Medium Brown | Red |
| 6 | Light Brown | Red/Orange |
| 7 | Dark Blonde | Orange |
| 8 | Light Blonde | Yellow/Orange |
| 9 | Very Light Blonde | Yellow |
| 10 | Light Platinum Blonde | Yellow |

Figure 1:
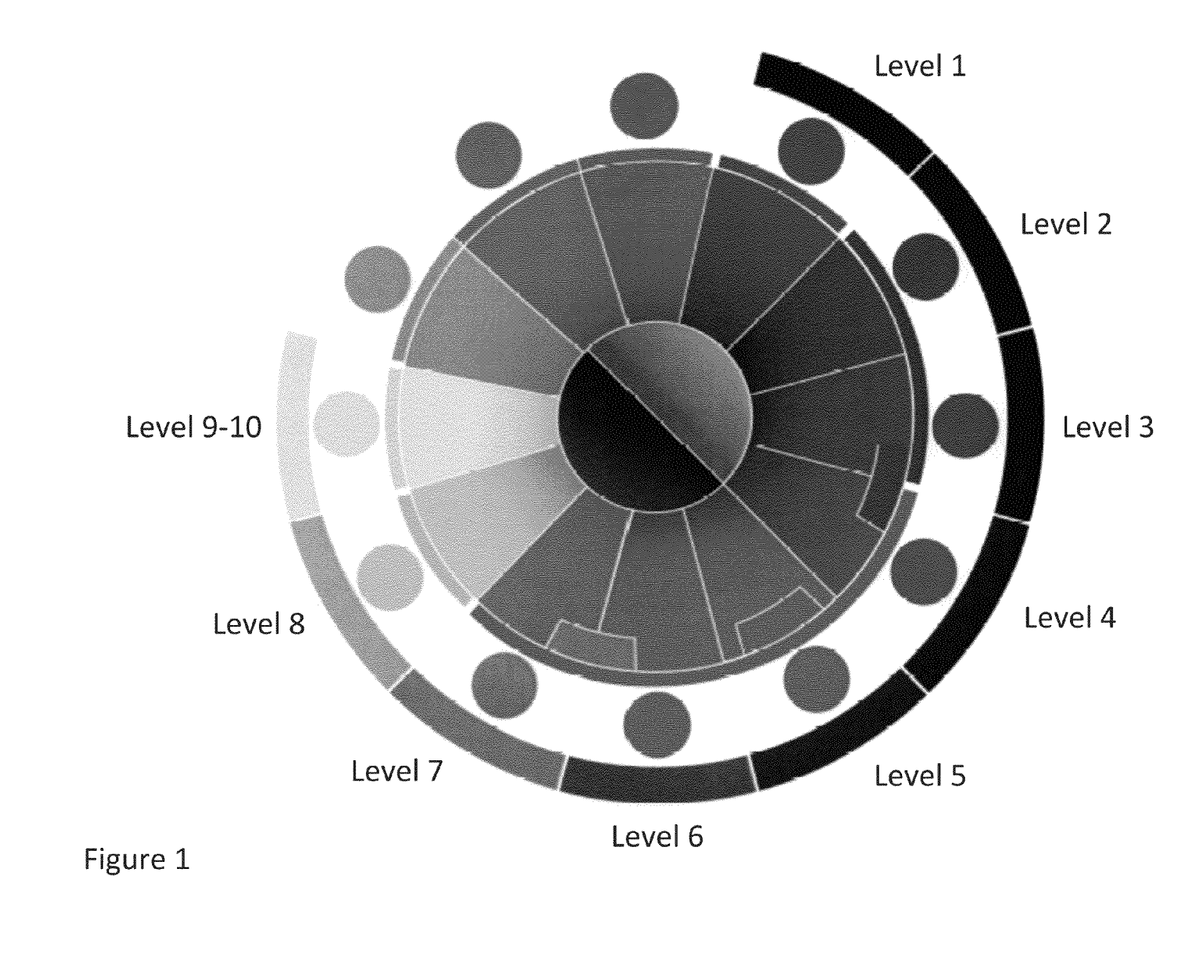
FIG. 1 shows a traditional two-dimensional color wheel, wherein the ten hair color types are on the outside of the wheel, arranged in numerical order and shade (1, 2, 3, and so on, through 10). Levels 6-10 are Blonde; Levels 1-5 are Brown. The colors required to enhance or neutralize the pigments of any one of the ten natural hair color types are arranged as spokes in the wheel, arranged according to the particular natural hair color type.

Cosmetologists may refer to a color wheel to ascertain the underlying pigment of a natural hair color, and the correct color that is required to neutralize the underlying pigments in the hair. An example of a color wheel is shown in FIG. 1. The hair color levels are arranged on the outside of the wheel, and the underlying pigment is shown in the segment immediately below the hair color level. In the segment opposite, the color required to neutralize the underlying pigment (also referred to as the complementary color) is shown, and the resulting final hair color is shown on the outside.

The present invention provides a teaching method and device wherein cosmetologists can learn the interrelationship of the hair color levels and their corresponding underlying pigments, such that hair color can be changed to achieve a natural looking result.

The Mannequin Head of the Present Invention

Hair cutting techniques, or coloring techniques are not performed on the mannequin head of the present invention directly, so realism with respect to the size of the head, texture of the hair, and the like is not an important factor in selecting a mannequin head suitable for use in the present invention. Accurate color is an important factor, as the mannequin head is a teaching aid, where the various hair color levels are displayed in a three-dimensional, touchable context familiar to the cosmetologist and capable of direct comparison with the hair to be colored, i.e., the hair of any of the colors of the various levels can be manipulated and compared by the cosmetologist in a way that cannot be achieved with a standard two-dimensional color wheel. As a result, in one embodiment, the mannequin head of the present invention may be manufactured cheaply, using artificial hair. However, any mannequin head is suitable for use in the present invention, provided the hair can be colored accurately, or accurately colored hair can be incorporated into the mannequin head in the configuration of a three-dimensional color wheel. For example, the present invention may utilize the mannequin head disclosed in U.S. Patent Application 20070269772A1. Alternatively, the present invention may utilize the mannequin head disclosed in U.S. Pat. No. 6,244,926. Alternatively, the present invention may utilize the mannequin head disclosed in U.S. Pat. No. 4,810,196. Alternatively, the present invention may utilize the mannequin head disclosed in U.S. Pat. No. 4,403,962. Alternatively, the present invention may utilize the mannequin head disclosed in U.S. Pat. No. 3,458,943. Alternatively, the present invention may utilize a mannequin head that is offered for sale in a trade journal, such as, for example the mannequins disclosed in the trade journal "Cameo Beauty", published by Cameo Beauty, 335 Merrick Road, Amityville, N.Y. 11701. Alternatively, the present invention may utilize a mannequin head that is offered for sale in a trade journal, such as, for example the mannequins disclosed in the catalog published by Boss Beauty Supply, Inc., 1380 Adams Road, Bensalem, Pa. 19020.

Figure 2:
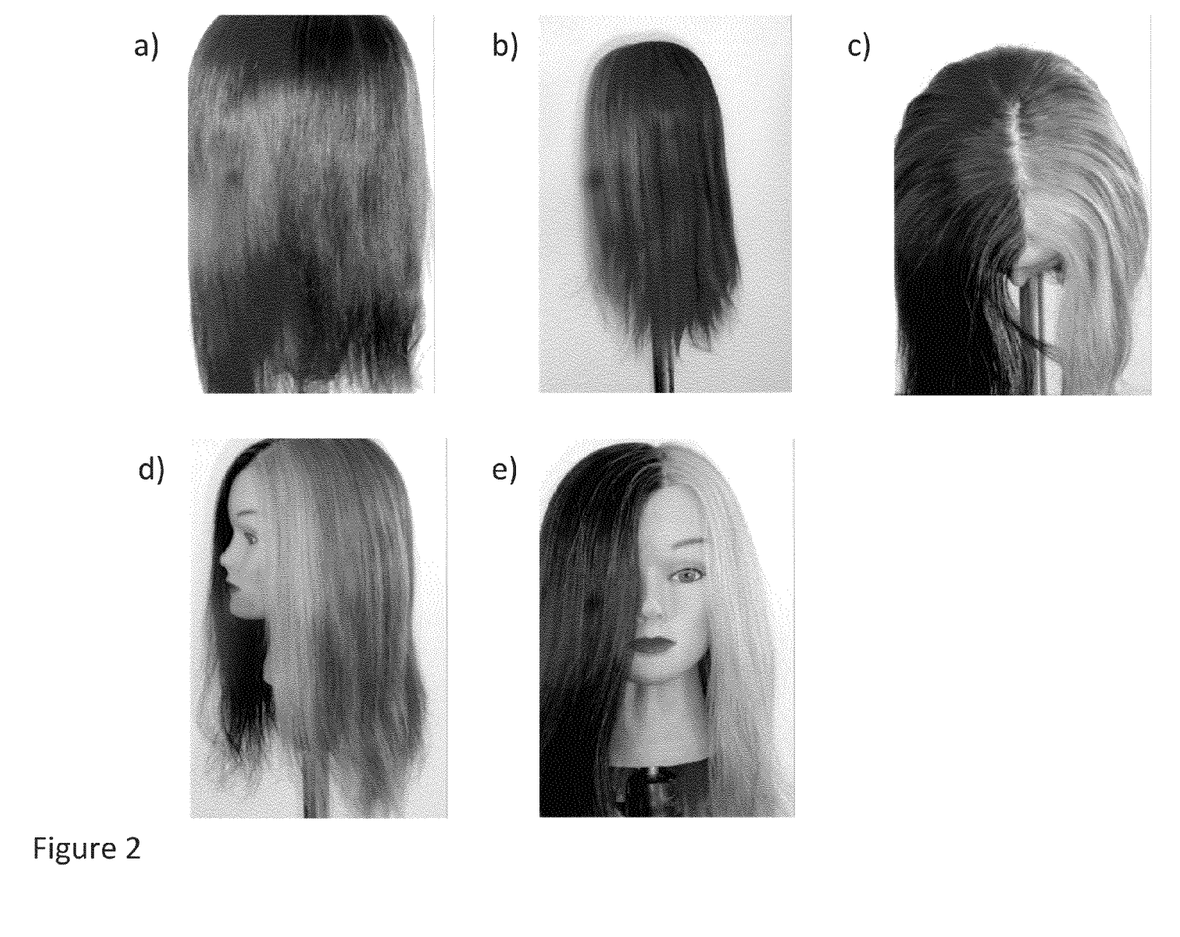
Figure 3:
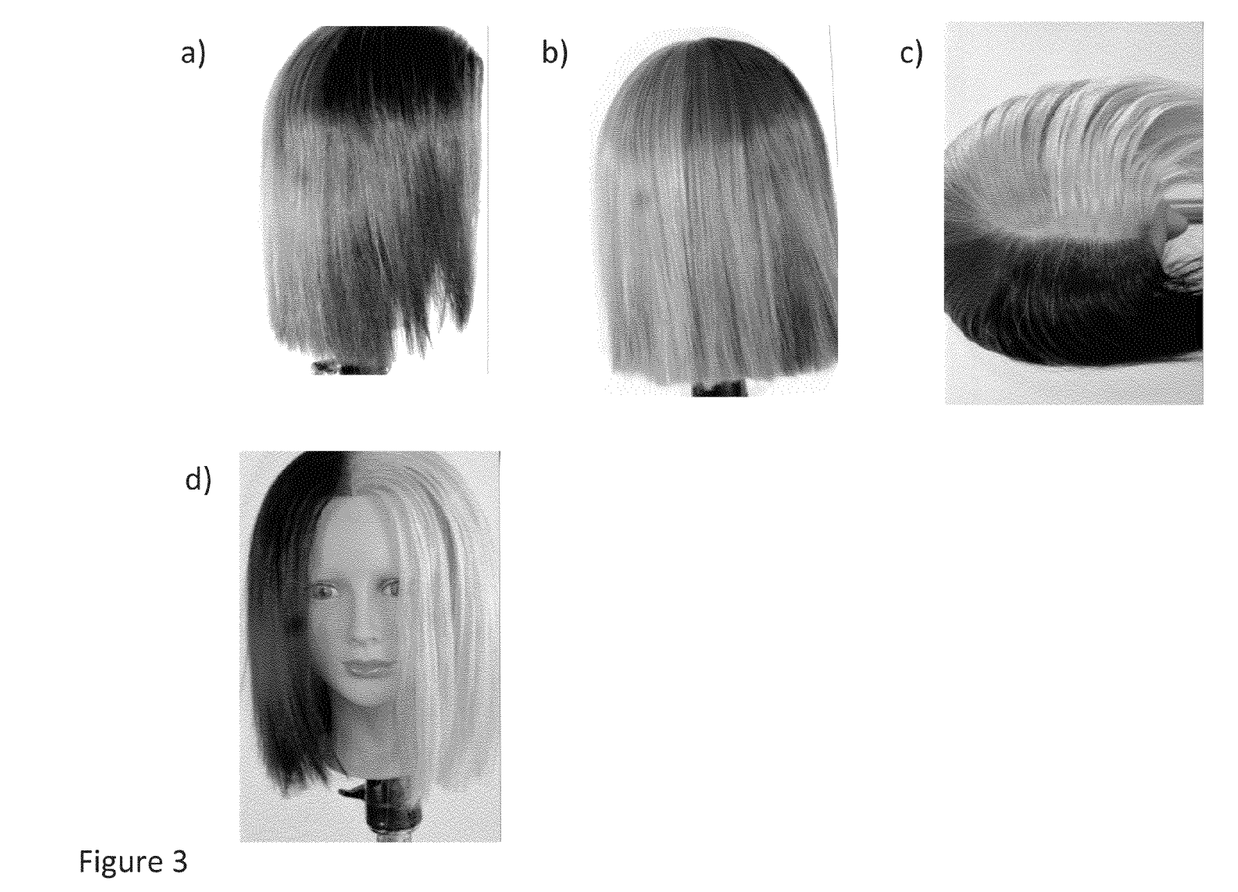

In one embodiment, the hair is dyed so as to function as a three-dimensional color wheel, wherein the hair is dyed in 10 equal segments, arranged circumferentially, wherein each segment corresponds to a single hair color level, selected from level 1 to 10, where in the first segment corresponds to level 1, the second to level 2, and so on, and within each segment, the hair is dyed the color of the underlying pigment of the color level the segment corresponds to. In one embodiment, this type of mannequin head is intended to teach an experienced cosmetologist hair color theory. A representative three-dimensional mannequin head of this embodiment is shown in FIG. 2. An alternative three-dimensional mannequin head depicting this embodiment is shown in FIG. 3.

In one embodiment, the hair is dyed in the configuration of a three-dimensional color wheel, wherein the hair is dyed in ten equal segments, arranged circumferentially, wherein each segment corresponds to a single hair color level, selected from level one to ten, where in the first segment corresponds to level one, the second to level two, and so on, and within each segment, the hair is dyed the color of the color level the segment corresponds to.

Figure 4:
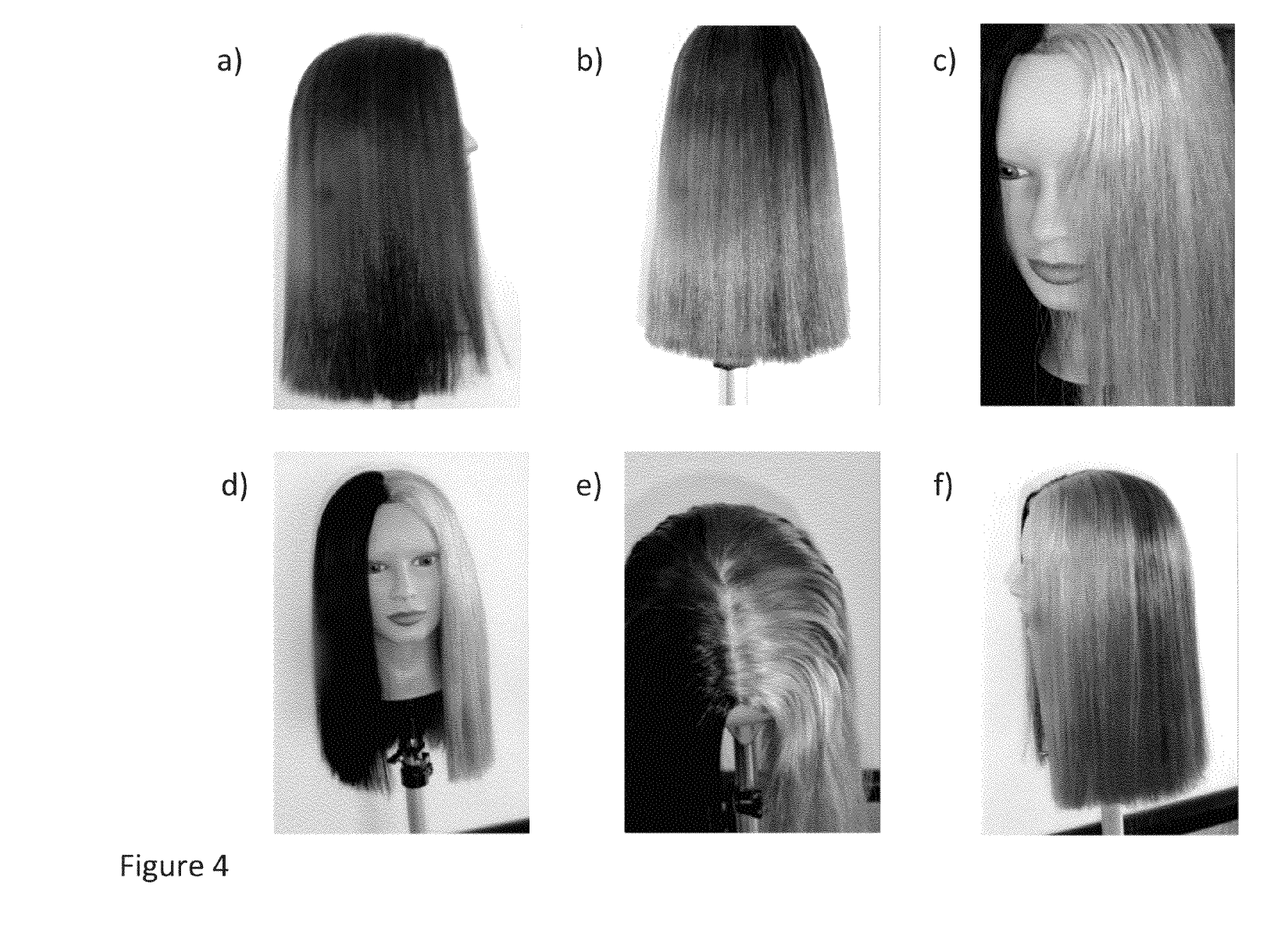

In one embodiment, the hair is dyed so as to function as a three-dimensional color wheel, wherein the hair is dyed in 10 equal segments, arranged circumferentially, wherein each segment corresponds to a single hair color level, selected from level 1 to 10, where in the first segment corresponds to level 1, the second to level 2, and so on, and within each segment, in a first area, the hair is dyed the color of the underlying pigment of the color level the segment corresponds to, and in a second area adjacent to first area, the hair is dyed the color of the color level the segment corresponds to. In one embodiment, this type of mannequin head is intended to teach a novice or student cosmetologist hair color theory. A representative three-dimensional mannequin head of this embodiment is shown in FIG. 4.

The mannequin head of the present invention is not intended to be used with any one particular brand or manufacturer of hair dyes. Rather, the mannequin head of the present invention may be used with any brand or manufacturer of hair dyes. Therefore, when either manufacturing or coloring the hair that will be incorporated into a given color level or underlying pigment of a segment of the mannequin head of the present invention, any color, may be used, provided that the final color corresponds to the desired underlying pigment or color level. The choice of color can be readily selected by one of ordinary skill in the art, and may be influenced by factors such as, for example, the intensity of the final color, the tone of the final color, and the like.

The hair used in the mannequin head of the present invention may be, for example, horse hair, human hair, nylon, polyester, acetate, olefin, aramid fibers, the monoacrylic fiber sold under the tradename KANEKALON®, the fiber sold under the tradename TOYOKALON®, and the like.

The hair may be dyed to the appropriate hair color level prior to being incorporated into the mannequin head of the present invention. Alternatively, the hair may be manufactured such that the resulting fiber is at the appropriate hair color level and then incorporated into the mannequin head. Alternatively, the hair may be incorporated into the mannequin head and then dyed in segments corresponding to the appropriate hair color level. Alternatively, a mannequin head may be purchased, and the hair dyed in segments corresponding to the appropriate hair color level.

In an alternate embodiment, a wig is used as the three-dimensional color of the present invention. In one embodiment, the wig may be placed onto a mannequin head that lack hair.

In one embodiment, the hair of the wig is dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, the hair of the wig is dyed the color of the underlying pigment of the color level the segment corresponds to.

In an alternate embodiment, the hair of the wig is dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, the hair of the wig is dyed the color of the color level the segment corresponds to.

In an alternate embodiment, the hair of the wig dyed in the configuration of a three-dimensional color wheel, wherein the hair of the wig is dyed in ten equal segments, arranged circumferentially, wherein each segment corresponds to a single hair color level, selected from level one to ten, where in the first segment corresponds to level one, the second to level two, and so on, and within each segment, in a first area, the hair of the wig is dyed the color of the underlying pigment of the color level the segment corresponds to, and in a second area adjacent to first area, the hair of the wig is dyed the color of the color level the segment corresponds to.

The mannequin head of the present invention can be life-size. Alternatively, the mannequin head of the present invention may be greater than life-size. Alternatively, the mannequin head of the present invention may be smaller than life-size. The size of the mannequin head may be chosen by various factors, such as, for example, the size of the group being taught, the size of the classroom, the requirements for portability of the mannequin head and/or whether such mannequin head is for individual use within a hair salon.

The Teaching Methods of the Present Invention

The present invention provides a method to teach hair coloring. Hair coloring may be the lightening, the darkening, the repigmentation, or the correction of inappropriately dyed hair of hair. In one embodiment, the present invention provides a hands-on approach for teaching hair coloring, utilizing a mannequin head of the present invention.

The present invention provides a method to teach hair coloring to persons of various levels of training or abilities. Such persons may include, for example, experienced or novice cosmetologists, or hairdressers, beauticians, or any person who may have occasion to color hair.

In one embodiment, the various segments of the mannequin head of the present invention provide a realistic representation of the various hair color levels, which cosmetologists are more able to visualize, memorize and recognize on patrons.

The teaching method and device of the present invention can be adapted for coloring agents obtained from any manufacturer.

In embodiments where hair is repigmented or lightened or darkened, the present invention is intended to teach cosmetologists how to recognize the starting hair color level, to remember the underlying pigments of the starting hair color level, to remember the complementary final hair color level, and to remember what color the coloring agents must be to create the final hair color level.

In embodiments where incorrectly dyed hair is corrected, the present invention is intended to teach cosmetologists how to recognize the starting hair color level, to remember the underlying pigments of the starting hair color level, to remember the complementary final hair color level, and to remember what color the coloring agents must be to correct the inappropriately pigmented hair. In one embodiment, correction of incorrectly dyed hair is referred to as reformulation.

In one embodiment, cosmetologists are able to utilize the mannequin head of the present invention to determine the hair color level of a patron, and then determine the complementary hair color level to which the patron's hair may be changed to. In an alternate embodiment, a patron has incorrectly dyed hair, and cosmetologists are able to utilize the mannequin head of the present invention to determine the hair color level of a patron, and then determine the correct coloring agent(s) to correct the incorrectly dyed hair.

In one embodiment, the mannequin head of the present invention may be used to directly determine the hair color level of a patron, by comparing the patron's hair to the segments of hair on the mannequin head. By being able to pull strands of the patron's hair immediately adjacent to strands on the mannequin head, which cannot be similarly accomplished with a two-dimensional color wheel, the determination of the hair color level of a patron is both simplified and more accurate.

The mannequin head of the present invention may be used as a teaching tool for any curriculum that teaches hair coloring techniques. Examples of curricula suitable for use with the mannequin head of the present invention include, but are not limited to, the curriculum disclosed in the website http://www.slideshare.net/knowledge4hair/color-theory-3374367, the curriculum disclosed in the website http://sidneyshair.com/about/cosmetology-cirriculum/, the curriculum disclosed in the website http://paulmitcheledu/advanced-academy/courses, the curriculum disclosed in the website http://www.regencybeauty.com/institute/curriculum/hair-coloring.aspx, and the like.

The mannequin heads provided by the present invention may be used as a teaching tool utilizing any form or type of teaching materials or curricula. An example of one such curriculum is shown in Example 1 below.

EXAMPLES

| Information | Teacher Prompts |
|---|---|
| Course Objective:<br>The objective of this course is to achieve a thorough understanding of underlying pigment and the use of the color wheel when formulating hair color. This deeper understanding will help students to achieve accurate color more easily and confidently.<br>Prerequisites:<br>Prior to this course, students should have an understanding of basic color theory, which will be provided by the manufacturer of the hair color that the students are currently using.<br>Class Setup:<br>Contact the director of the school or the salon owner and set up a course. Discuss the length and the content of the course. Establish the brand the salon is using. Confirm the course at least 3 days prior. Arrive at the salon/school at least 15 minutes before the scheduled class in order to allow enough time to set up mannequin | Ask the Student-Hairdresser:<br>What challenges are you experiencing with formulating hair color?<br>What is the most valuable thing you want to accomplish in this class? |

-continued

| Information | Teacher Prompts |
|---|---|
| tripods, color wheels, and any additional marketing tools for Bella's Way ™. The course will take approximately 1 hour to 1 hour 15 minutes.<br>Course Materials:<br>Color wheel chart<br>Tripod and mannequins<br>Manufacturer's color swatch book<br>Paper charts<br>Marketing brochures<br>Blank formulation worksheets<br>Colored pens/markers<br>Opening: | |
| Begin by introducing yourself and giving a personal testimony. Ensure that your testimony is germane and important to the class. Ask students about their knowledge and confidence pertaining to color formulation, and how they think they can improve. Discuss why you want to teach this class; by delineating how this class has personally benefited you, you will establish a commonality with your audience. Preview the printed materials:<br>Class Overview: | Your personal testimony is important; it should be specific not only to your experience with hair color, but also to your experience with using Bella's Way ™ to formulate color. Include how, throughout your career, she will remain a constant guide and reference tool that increases your accuracy and confidence with color formulation. Describe how she has helped expand your clientele. |
| Set the agenda for the class. Position Bella's Way ™ and detail how she will help students better formulate color because she adds a visual and tactile component to their understanding of color. | Instruct the class to write down what they find important during the course so that they can reflect back on Bella's Way ™ for future reference. The overview should be brief, as the details will be presented in the demonstration. At this time, Bella's Way ™ should be introduced: The instructor should explain her purpose and how she can be integrated by both fledgling and veteran hairdressers into their color formulation. |
| Body:<br>Bella's Way ™ is a foolproof method by which hairdressers may comfortably and accurately identify how to enhance and neutralize color. Bella's Way ™ serves as a visual companion to the color wheel; students will be able to see-rather than imagine-the underlying pigment in Bella's Way ™ hair and, using their knowledge of the color wheel, formulate the color to match their client's specifications.<br>Introduce the level system as it pertains to base color, with 1 representing the darkest brown/black and 10 representing the lightest blond.<br>Emphasize that all hair color has limitations when it comes to lifting natural pigments. Knowing these limitations will enable students to discuss with their clients the levels of lift they will be able to achieve.<br>In addition to the underlying pigment, the porosity and density of the hair contribute to the limitations of color. Define porosity as how absorbent or chemically damaged the hair strands are. Like a sponge, hair is porous, and it absorbs colors differently. For instance, because of its porosity, hair will latch onto cool colors (blue, blue violet) and result almost in a stain on the hair. If a brown base is placed on porous blond hair, the effect will be a murky, green tone.<br>Density is the thickness of the hair. Density can be measured by the size of the ponytail (finer hair makes smaller ponytails; denser hair makes larger ponytails). All hair color theory is done on medium hair. Finer hair will be easier to lighten; denser hair will be more difficult.<br>Understanding Underlying Pigment: | Question how students formulate color at the present time with the color manufacturer they are currently using. Display the side of Bella's Way ™ head that features the natural base levels of 1 through 10. Ask students to observe how the levels compare to one another.<br>Explain that most manufacturers' color will not lift more than 4 levels. For example, a hairdresser cannot make a level 4 into a level 9 clear blond with highlift.<br>Show students the dimensions of the ponytails by drawing circles. |

| Information | Teacher Prompts |
|---|---|
| Hair is 1% melanin, which makes up the color of the hair. When hair is lightened, melanin is affected, leaving an underlying pigment. The residual melanin (underlying pigment) will combine with the applied dye in order to create the new hair color. Eumelanin is found in levels 1 to 5 (sometimes 6) and contains more iron. The color processing oxidizes the hair, which will turn it red. Pheomelanin is found in levels 6 to 10 and contains copper, which will turn hair orange. The number of levels will determine the percentage of peroxide to use (10, 20, 30, 40 vol.), depending upon the manufacturer's directions. Color Formulation: 1. Determine the client's hair color by accurately identifying the original hair color on Bella's Way ™. 2. Decide with the client whether the desire result should be lighter, darker, or remain the same. 3. Refer to Bella's Way ™ to find the underlying pigment at the selected level. 4. Considering the underlying pigment level on Bella's Way ™, decide with the client whether to make the color bolder or more neutral. The Color Wheel: Warm colors: red, orange, yellow Cool colors: green, blue, violet Opposite colors will neutralize the hair. For example, adding blue will make a color darker. The underlying pigment is unaffected unless the hair is darkened by 2 or more levels. If the hair is artificially lightened to a level 9 or higher, the hair will need to have all the underlying pigment replaced if a darker color is desired. Otherwise, an undesired result will occur. Refer to the expanded color level chart on Page 6. Gray Coverage: All manufacturers have their own way of mixing colors for gray coverage. However, this may serve as a reference point for students: If less than half of the head (0-30%) is gray (no pigment), the underlying pigment is still more important than the gray. If half of the head is gray, the underlying pigment is half as important. If more than half of the head (50-100%) is gray, the underlying pigment is less important to unimportant. | Using the mannequins as your visual aid, display the natural hair on one side-level 10 to 1-and then show the opposite side showing the underlying pigment. Explain underlying pigment and how melanin impacts tone. Give examples: If a level 5 wants to be a level 7, show the color of level 7's underlying pigment. At level 7, the underlying pigment is orange. The class can visualize this both by referring to Bella's Way ™ and by referring to the color wheel. Explain how to enhance the orange with a copper. The opposite color-blue-will neutralize the orange. Students will refer to the manufacturer's colors in order to locate the base. Explain the color wheel and why they need to know it. Present further examples to illustrate its importance. Review the different options available to darken color (semi, demi, permanent). Replacing underlying pigment must be done 2 levels at a time. For example, if a level 9 wants to be a level 7, the yellow (level 9) and yellow orange (level 8) underlying pigment must be replaced before placing a level 7 brown into the hair. Because over-lightened hair is usually porous, the blue from the brown color will be absorbed unless the hair is pre-colored with yellow orange, which acts as a neutralizer. Review further examples. Ask students to create other formulations and discuss. Relate these examples to Bella's Way ™ and demonstrate how she will make a profound difference in the ease and accuracy with which they formulate colors. Closing: Thank the class for their attendance. Remind them of the most important base points that were covered. Congratulate the class and challenge them to reflect on how Bella's Way ™ has helped enrich their understanding of color and how Bella's Way ™ can improve their careers moving forward. |

Color Level Chart:

| Level | Natural Color | Underlying Pigment |
|---|---|---|
| 1 | Black | Blue |
| 2 | Darkest Brown | Blue Violet |
| 3 | Brown | Violet |
| 4 | Medium Brown | Red Violet |
| 5 | Lightest Brown | Red |
| 6 | Darkest Blond | Red Orange |
| 7 | Blond | Orange |
| 8 | Medium Blond | Yellow Orange |
| 9 | Light Blond | Yellow |
| 10 | Lightest Blonde | Pale Yellow |

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A three-dimensional mannequin head with hair, wherein the hair is dyed in the configuration of a color wheel, wherein the hair is dyed in ten segments, arranged circumferentially, wherein each segment corresponds to a single hair color level, selected from level one to ten, wherein the first segment corresponds to level one, the second to level two, and so on, and within each segment, the hair is dyed the color of the underlying pigment of the color level the segment corresponds to.

2. The three-dimensional mannequin head of claim 1, wherein the hair is synthetic hair.

3. The three-dimensional mannequin head of claim 1, wherein the hair is a wig.

4. A three-dimensional mannequin head with hair, wherein the hair is dyed in the configuration of a color wheel, wherein the hair is dyed in ten segments, arranged circumferentially, wherein each segment corresponds to a single hair color level, selected from level one to ten, where in the first segment corresponds to level one, the second to level two, and so on, and within each segment, in a first area, the hair is dyed the color of the underlying pigment of the color level the segment corresponds to, and in a second area adjacent to first area, the hair is dyed the color of the color level the segment corresponds to.

5. The three-dimensional mannequin head of claim 4, wherein the hair is synthetic hair.

6. The three-dimensional mannequin head of claim 4, wherein the hair is a wig.

7. A three-dimensional mannequin head with hair, wherein the hair is dyed in the configuration of a color wheel, wherein the hair is dyed in ten segments, arranged circumferentially, wherein each segment corresponds to a single hair color level, selected from level one to ten, where in the first segment corresponds to level one, the second to level two, and so on, and within each segment, the hair is dyed the color of the color level the segment corresponds to.

8. The three-dimensional mannequin head of claim 7, wherein the hair is synthetic hair.

9. The three-dimensional mannequin head of claim 7, wherein the hair is a wig.

* * * * *